June 26, 1951      L. J. ANDRES      2,558,505

MULTIPLE-PHONOGRAPH CONTROL

Filed April 16, 1949

INVENTOR.

Lloyd J Andres

Patented June 26, 1951

2,558,505

UNITED STATES PATENT OFFICE 2,558,505

MULTIPLE-PHONOGRAPH CONTROL

Lloyd J. Andres, Chicago, Ill., assignor to Permo, Incorporated, Chicago, Ill., a corporation of Illinois Application April 16, 1949, Serial No. 87,999

3 Claims. (Cl. 179—100.4)

This invention relates in general to phonographs and more particularly to an electric means for controlling two or more record changers for sequence operation.

Because of the limited number of records, usually ten, which may be played on a conventional stacked type record changer and because it is often desirable to have continuous reproduction over a longer period of time, this invention provides automatic means whereby two or more changers will automatically operate in sequence, thus extending the playing time in proportion to the number of record changers used.

A principal object of the invention is the provision of an electric control device connected to one or more record changers whereby the manual initiation of the device will cause the first record changer to play its normal complement of records and upon the completion of its last record to automatically start a second record changer to complete the play of its records and likewise automatically stop.

A further object of the invention is the provision of a step by step rotary relay connected to a switch means in each record changer whereby upon manual initiation thereof each record changer will consecutively play a predetermined complement of records.

Another object of the invention is the provision of electric control means for operating two or more record changers in sequence provided with an indicator showing which particular record on each record changer is playing.

These and other objects of the invention will be apparent in one embodiment of the invention described and shown in the appended specification and drawing in which:

Fig. 1 illustrates two conventional stacked type record changers 1 and 2, each of which, when manually loaded with a predetermined plurality of records, will play each record in sequence when energized. Record changers of this character automatically cycle to release a subsequent record upon the completion of play of each record.

Figure 1:
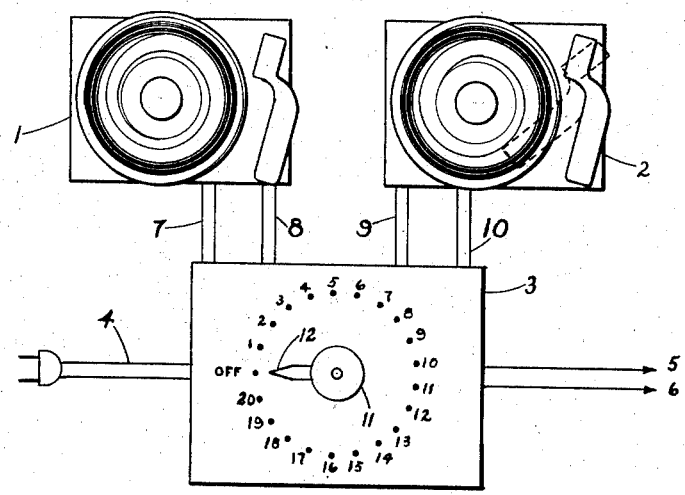
Fig. 1 is a plan view of two conventional record players connected to a control device.

A control device 3 is connected to a source of power through conductors 4 and is provided with sound output conductors 5 and 6 which are normally connected to an amplifier and loud speaker, not shown. Conductors 7—8 and 9—10 are connected to each record changer 1 and 2 respectively. The control device is manually operable by a knob 11 to which a pointer 12 is attached indicating an "off" position and a plurality of other positions corresponding to particular records being played.

Figure 2:
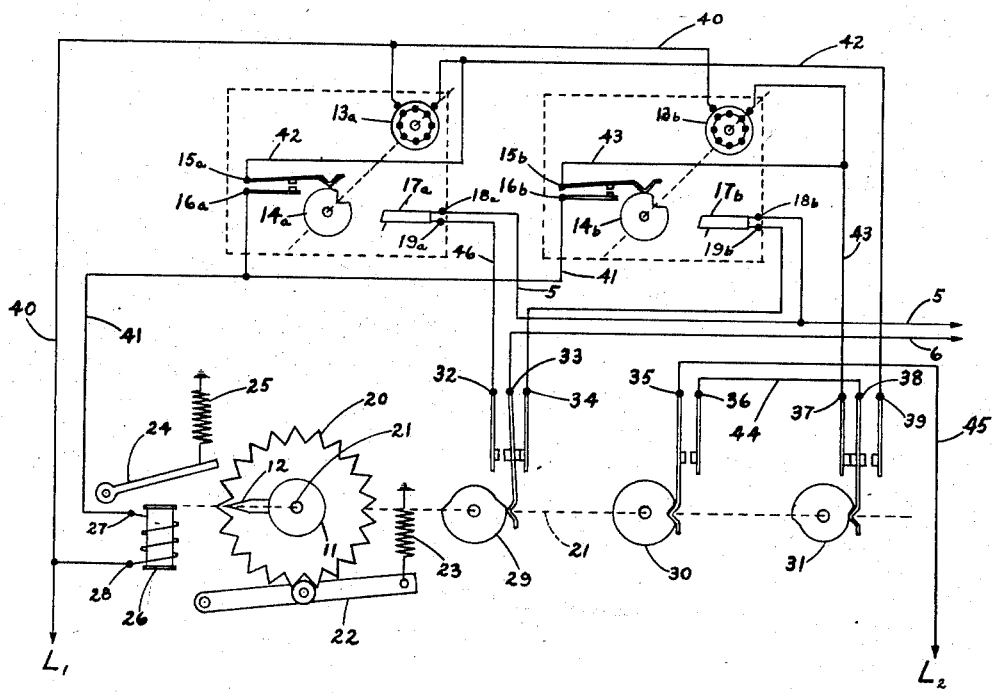
Fig. 2 is a schematic diagram of the control device and circuits connecting two record changers.

Referring to Fig. 2 the dotted outlines include the electrical components of each record changer 1 and 2 shown Fig. 1. Each record changer is driven by an electric motor 13a and 13b respectively.

Cam members 14a and 14b are adapted to operate through a predetermined movement during each "cut-off" cycle of each record changer. A pulsing switch having blades 15a and 16a is positioned for operation by cam 14a and adapted to momentarily close during the "cut-off" cycle of record changer 1. Likewise a pulsing switch having blades 15b and 16b is positioned for operation by cam 14b and adapted to momentarily close during each "cut-off" cycle of record changer 2.

Each record changer is provided with a conventional pickup 17a and 17b respectively which have terminals 18a—19a and 18b—19b. The control device consists essentially of a stepping relay having a toothed wheel 20 coaxially secured to shaft 21 to which the control knob 11 and the pointer 12 are attached. A detent arm 22 is pivotally secured at one end and urged into contact with the teeth of wheel 20 by spring 23. A pivotally mounted armature pawl 24 is normally urged into position shown by spring 25.

An electro-magnet 26 having terminals 27 and 28 is positioned to attract pawl 24 and adapted to advance wheel 20 a movement of one tooth when momentarily energized. Control cams 29, 30 and 31 are secured to shaft 21 and adapted to be driven thereby. A pickup transfer switch having blades 32, 33 and 34 is positioned to be operated by cam 29. An "on-off" switch having blades 35 and 36 is positioned to be operated by cam 30 and a transfer switch having blades 37, 38 and 39 is positioned to be operated by cam 31.

A conductor 40 is connected to one side of a source of electric power L₁ to magnet terminal 28 and to one terminal of each motor 13a and 13b. The remaining terminal 27 of magnet 26 is connected by conductor 41 to switch blades 16a and 16b. Switch blade 15a is connected by conductor 42 to the remaining terminal of motor 13a and to switch blade 39. Switch blade 15b is connected by conductor 43 to the remaining terminal of motor 13b and to switch blade 37. Switch blade 38 is connected to switch blade 36 by conductor 44. Switch blade 35 is connected to the remaining side of a source of power L2 by conductor 45. Pickup terminal 18a is connected to switch blade 32 by conductor 46. Sound conductor 5 is connected to pickup terminals 18a and 18b. Switch terminal 33 is connected to the remaining sound conductor 6.

The cams 29, 30 and 31 and their related switches are shown for the purpose of simplification and it is obvious to those skilled in the art that rotary type commutator switches may be alternately used to obtain the identical operation.

In operation and assuming that ten records are placed in each record changer 1 and 2 and the control knob 11 is manually positioned at "off" as shown, then all elements will be in the position shown Fig. 2. When the control knob is moved to position 1 the shaft 21 will move cams 29, 30 and 31 to operate their corresponding switches and will be temporarily held in this position by detent arm 22. A circuit through "on-off" switch 35—36 through the now closed blades 38 and 39 will energize motor 13a in record changer 1 and begin the play of the first record thereon and the now closed switch blades 33—34 will transmit the sound energy from record changer 1 to output conductors 5 and 6.

Upon the completion of the play of the first record in record changer 1 the machine will automatically "cut-off" and cycle to release a second record and simultaneously and momentarily close the switch blades of the pulsing switch 15a and 16a by virtue of the motion of cam 14a, thus momentarily energizing electromagnet 26 to advance wheel 20 an additional tooth, thus beginning the play of number 2 record, with pointer 12 indicating number 2 record on the dial shown Fig. 1.

Record changer 1 will continue operation until all the records thereon are played, at which time the cams 29 and 31 will operate their corresponding switches. The movement of switch blade 33 will transfer the sound output from pickup 17a to pickup 17b. The movement of switch blade 38 will de-energize motor 13a and energize motor 13b, which will result in the playing of the first record in record changer 2. Upon the completion of the playing of the first record in record changer 2, the automatic "cut-off" cycle will release the second record and simultaneously operate cam 14b to momentarily close switch blades 15b and 16b which will momentarily energize magnet 26 to advance wheel 20 a distance of one tooth. This automatic cycling will continue until the completion of the last record in record changer 2, at which time the shaft 22 will move cam 30 to automatically open "on-off" switch 35—36 to de-energize motor 13b and thus stop the operation of the device.

It is apparent that the cams 14a and 14b may be substituted for reciprocating parts readily available in most record changers which operate only during the "cut-off" cycle of the record changer. It will also be apparent to those skilled in this art that additional record changers may be caused to operate in sequence by providing a greater number of teeth to stepping wheel 20 and providing proper contour to cams 29 and 31 for proper sequence of operation. It will under these circumstances be necessary to add additional parallel connected switches for transferring the sound output of the pickups to sound conductors 5 and 6 instead of using the single pole double throw switch as shown.

Having described my invention I claim:

1. In combination, a plurality of record changers each of which are adapted to play and change a predetermined number of records, each of said changers having an electric pulsing means operative to produce a pulse with each change of a record, pick-up means and sound reproducing means responsive to each pick-up means, stepping means having a plurality of positions, said stepping means comprising a member adapted to be advanced one position by each pulse, switch means for said record changers operated by means in contact with said member, a source of electric energy, circuit means connecting said source to each of said changers, to said stepping means and to said switch means, means upon movement of said stepping means for operating said switch means to energize one record changer and de-energize the remaining record changers, means responsive to pulses from the pulsing means of said one changer to operate said stepping means together with said means for operating said switch means a predetermined number of positions whereby a selected number of records of said one changer are played and means operative after a predetermined number of pulses to shift the control of said stepping means to the pulsing means of another of said changers whereby a predetermined number of records of said other changer are played.

2. In combination, a plurality of record changers each of which are adapted to play and change a predetermined number of records, each of said changers having an electric pulsing means operative to produce a pulse with each change of a record, pick-up means and sound reproducing means responsive to each pick-up means, electromagnetically operated stepping means having a plurality of positions, said stepping means comprising a shaft member adapted to be advanced one position by each pulse, switch means for each of said record changers operated by means in contact with said member, a source of electric energy, circuit means connecting said source to each of said changers, to said stepping means and to said switch means, means upon manual movement of said stepping means to its first position for operating one of said switch means to energize one record changer and de-energize the remaining record changers, means responsive to pulses from the pulsing means of said one changer to operate said stepping means together with said means in contact with said member a predetermined number of positions whereby a selected number of records of said one changer are played and means operative after a predetermined number of pulses to shift the control of said stepping means together with said means in contact with said member to the pulsing means of another of said changers whereby a predetermined number of records of said other changer are played.

3. In combination, a plurality of record changers each of which are adapted to play and change a predetermined number of records, each of said changers having an electric pulsing means operative to produce a pulse with each change of a record, pick-up means and sound reproducing means responsive to each pick-up means, electro-magnetically operated stepping means having a plurality of positions, said stepping means comprising a shaft member adapted to be advanced one position by each pulse, cam means fixed upon said member, switch means for each of said record changers operated by said cam means, a source of electric energy, circuit means connecting said source to each of said changers, to said stepping means and to each of said switch means, means upon manual movement of said stepping means to its first position for rotating said cam means an amount sufficient to operate one of said switch means to energize one record changer and de-energize the remaining record changers, means responsive to pulses from the pulsing means of said one changer to operate said stepping means together with said cam means a predetermined number of positions whereby a selected number of records of said one changer are played, means to shift the control of said stepping means to the pulsing means of another of said changers and to further rotate said cam means to operate the switch means of said other changer and means responsive to the pulses from the pulsing means of said other changer to operate said stepping means and to rotate said cam means a predetermined number of positions whereby a predetermined number of records of said other changer are played.

LLOYD J. ANDRES.

REFERENCES CITED

The following references are of record in the file of this patent:

UNITED STATES PATENTS

| Number | Name | Date |
| --- | --- | --- |
| 2,031,075 | Scheibell | Feb. 18, 1936 |
| 2,042,228 | Huenlich | May 26, 1936 |
| 2,231,517 | Andres | Feb. 11, 1941 |
| 2,302,155 | Taylor | Nov. 17, 1942 |
| 2,362,803 | Clausen | Nov. 14, 1944 |